United States Patent Office 3,642,695
Patented Feb. 15, 1972

3,642,695

CURING AGENT FOR A LOW RESILIENCE DIEPOXIDE RESIN COMPOSITION

Buford F. Barnett, Anaheim, and Gilbert M. Knaus, Fullerton, Calif., assignors to North American Rockwell Corporation No Drawing. Continuation-in-part of abandoned application Ser. No. 715,714, Mar. 22, 1968. This application Aug. 27, 1970, Ser. No. 67,614
Int. Cl. C08g *30/12*
U.S. Cl. 260—47 EA 3 Claims

ABSTRACT OF THE DISCLOSURE

A low resilience composition which is cured under a temperature range of 180° F. to 250° F. within the period of from 16 to 24 hours. The composition comprises the reaction product of a bisphenol A-epichlorohydrin type epoxy having the epoxy equivalent of between 120 and 1000, and a curing agent consisting of the reaction product of glyceryl triricinoleate and a cyclic anhydride of dicarboxylic acid having the following chemical structure:

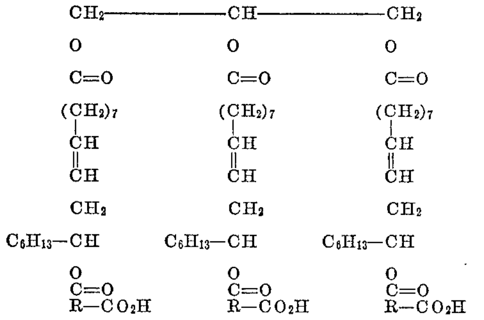

The ratio of the epoxy equivalent to the curing agent carboxyl equivalent is 1/.5 to 1/.8 R in the above formula represents an alkylene.

Principal utility of the invention is to enable encapsulation of individual electronic components or systems in a low resilience, energy-absorbing potting or encapsulating compound, to provide structural and environmental protection for the encapsulated product.

CROSS REFERENCE TO RELATED APPLICATION

This is a continuation-in-part of application Ser. No. 715,174, filed Mar. 22, 1968 for Low Resilience Diepoxide Resin Compositions, now abandoned.

(1) Field of the invention

The present invention relates to low resilience epoxy resin compositions and more particularly to low resilience compositions comprising the reaction product of an epoxy resin containing at least two oxirane groups per molecule with a curing agent comprising the reaction product of castor oil and a cyclic anhydride of a dicarboxylic acid, and wherein the ratio of the epoxy equivalent to the carboxyl equivalent is between 1/.5 and 1/.8.

(2) Description of the prior art

The increasing use of electronic equipment in aircraft and missiles has placed severe requirements on the ability of electronic components to withstand vibration and mechanical shock. The components must withstand the severe forces associated with liftoff, landing, and maneuvers both in and above the atmosphere, without degradation in performnce. This is demanded since the electronic equipment may be functioning to provide flight control or guidance for the vehicle in which it is housed.

In the past, various techniques have been devised to make electronic components sufficiently rugged as to withstand severe vibrational environments. For example, entire electronic packages have been mounted on appropriate shock absorbers which prevent vibration of the airframe from being transmitted to the electronic package. Still another approach has been to encapsulate individual electronic components or microelectronic subsystems in a low resilience, energy absorbing potting compound. These approaches to varying degrees have been successful in facilitating normal electronic circuit operation under extreme conditions of vibration or mechanical shock.

A variety of prior art materials have been used for fabrication of equipment shock mounts and as energy absorbing potting or encapsulating materials. The resiliency of these materials commonly is tested in a Bayshore resiliometer, a device in which a small weight is dropped on a specimen, the height to which the weight rebounds being indicated on a scale. Full scale is 100 units, so that the measured value is expressed as a percentge of the original drop height. Since the resilience of a material is indicative of the capability of the material to regain its size and shape after deformation, it is apparent that the lower the resilience of a material, the better suited it is for use as a vibration or shock absorber.

Materials which have been used in the past for shock absorbers or as energy absorbing encapsulation compounds include rubbers of the silicone, natural gum, neoprene, and butyl variety. When tested on a Bayshore resiliometer, typical silicone rubbers having a Shore A hardness of 37 exhibit resiliometer readings of about 58. Neoprene rubber, Shore A hardness 47, gave a resiliometer reading of 27, and butyl rubber of Shore A hardness 45 exhibited a resiliometer reading of 55. Thus, the best of the energy absorbing encapsulation or shock mounting materials of the prior art exhibited typical resiliometer readings of greater than about 25.

The prior art is believed represented by Pat. No. 3,438,-909 to Kleeberg et al. for a Method of Producing Flexible Epoxy Resins and Pat. No. 2,999,824 to Singleton et al. for Polyepoxide Products. Although the patents do teach and show compositions involving epoxy resins, neither of the patents teach or show a low resiliency compound having a critical molar ratio of epoxy to carboxylic acid curing agent within the range of the present invention. The lower ratio of the present invention yields products of extremely low resiliency whereas the relatively higher ratios taught by the prior art patents do not provide the relatively low resiliency intended by the present invention.

Of course, it would be desirable to obtain materials having much lower resilience than obtainable in the prior art. To this end, the present invention sets forth an energy absorbing epoxy resin composition having very low resilience, as typified by Bayshore resiliometer readings considerably below 20. In addition, the inventive low resiliency compositions exhibit hardnesses commensurate with energy absorbing materials of the prior art, and also exhibit good solvent resistance and low water absorption.

SUMMARY OF THE INVENTION

In accordance with the present invention there is provided an energy absorbing, low resilience epoxy resin composition useful as a potting or encapsulation compound for electronic components and the like. The composition comprises an epoxy resin containing more than one oxirane group per molecule, the epoxy resin being cured using an adduct comprising the reaction product of castor oil and a cyclic anhydride of a dicarboxylic acid. In a typical embodiment, the epoxy resin may comprise a bisphenol A-epichlorohydrin type having an epoxy equivalent of between 175 and 550. The curing agent or adduct may comprise the stoichiometric reaction product of glyceryl triricinoleate (castor oil) and a dicarboxylic acid anhydride, typically phthalic, succinic, malonic or maleic anhydride. The critical range for the ratio of epoxy equivalent to carboxyl equivalent is 1/.5 to 1/.8. The resulting composition has the required resiliency compositions when the epoxy equivalent to the carboxyl equivalent is within the range indicated. Higher and lower ranges result in compositions having relatively higher resiliency measurements.

Energy absorbing epoxy resin compositions in accordance with the present invention typically exhibit Bayshore resiliometer values considerably less than 20, the specific resiliency value depending somewhat on the ratio of epoxy equivalents in the resin to COOH equivalents in the curing agent.

Thus, it is an object of the present invention to provide a very low resilience material.

Another object of the present invention is to provide an epoxy resin composition useful for energy absorbing applications.

Yet another object of the present invention is to provide a low resilience epoxy resin composition useful as a potting or encapsulation compound for electronic components wherein the ratio of epoxy equivalent to carboxyl equivalent is within the range of 1/.5 to 1/.8.

It is another object of the present invention to provide a composition comprising an epoxy resin cured with an adduct comprising the reaction product of castor oil and a cyclic anhydride of a dicarboxylic acid.

A further object of the present invention is to provide a low resilience composition comprising an epoxy resin having more than one oxirane group per molecule and cured by an adduct comprising the reaction product of glyceryl triricinoleate and dicarboxylic acid anhydride.

It is still a further object of the present invention to provide epoxy resin compositions having Bayshore resiliometer values considerably less than 20.

Still other objects, features and attendant advantages of the present invention will become apparent to those skilled in the art from a reading of the following detailed description of the preferred embodiments constructed in accordance therewith.

DESCRIPTION OF THE PREFERRED EMBODIMENTS

The inventive low resilience epoxy resin composition comprises an epoxy containing more than one oxirane group per molecule, the epoxy being mixed in appropriate proportions with a curing agent or adduct prepared by the reaction of castor oil with a dicarboxylic acid anhydride, and cured under the influence of heat. The rate for curing epoxy is well known, and temperatures of 150° to 300° F. for a period of six to twenty-four hours is acceptable. The result composition is a soft solid material characterized by extremely low resiliency.

Epoxy resins useful in the present invention have at least two oxirane groups per molecule. Typically, such resins may comprise the products of a phenol having at least two phenolic hydroxy groups and an epihalogenohydrin, e.g., epichlorohydrin, the product containing more than one oxirane group per molecule. The chemical structure of a typical molecule of such a resin is as follows:

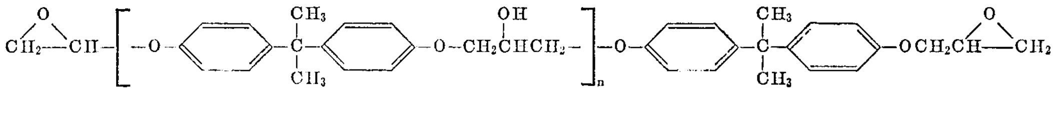

To produce the inventive low resilience compositions, the epoxy resin is mixed with a curing agent or adduct (III) which comprises the reaction product of castor oil or the like (I) with a dicarboxylic acid anhydride (II), the reaction being indicated by the following Equation 1.

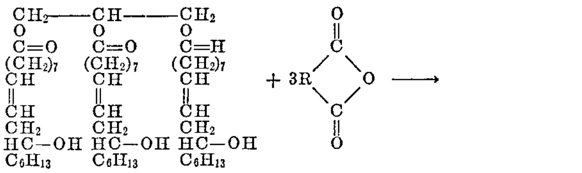

(I) (II)

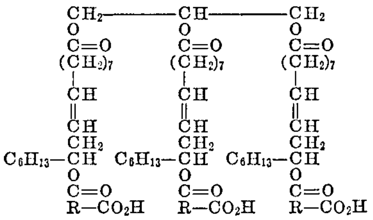

(III)

Castor oil (I) consists of approximately 90% of the triglyceride of ricinoleic acid, an 18 carbon acid having a double bond in the 9–10 position and a hydroxyl group on the carbon in the 12 position. Alternatively, the starting material (I) may have a hydroxyl group in a chain position other than the 12 position characteristic of castor oil.

In the dicarboxylic acid (II), R may comprise a phenyl, substituted phenyl, a saturated alkyl or an unsaturated alkyl. Typically, R may comprise one of the groups listed in the following table.

| R: | (II) |
|---|---|
| $C_6H_5$ | Phthalic anhydride. |
| $CH_2$ | Malonic anhydride. |
| $CH_2CH_2$ | Succinic anhydride. |
| CH=CH | Maleic anhydride. |

Since the caster oil-anhydride adduct (III) essentially comprises a tricarboxylic acid, it will be apparent to those skilled in the art that the resultant cured product obtained by reacting the castor oil-anhydride adduct (III) with a diepoxide resin (IV) comprises a crosslinked thermoset composition (V). The curing reaction primarily is as follows:

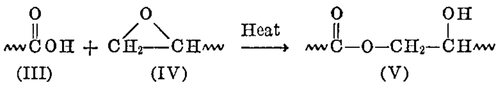

(III) (IV) (V) (2)

The reaction product (V) is a soft composition having extremely low resiliency.

In a typical embodiment, the castor-oil-anhydride adduct (III) may be prepared in the following manner. A resin kettle is charged with 1½ moles of anhydride (II) for each hydroxyl equivalent of castor oil (I). The 50% excess of anhydride prevents side reactions and insures complete monoesterification of the castor oil. A small amount (0.5%) of N,N-dimethylbenzylamine is added as a catalyst, and the charge heated for 6 to 8 hours at a temperature of between 120° C. and 130° C. Completion of the reaction is determined by infraded analysis.

Next, for each mole of excess anhydride in the charge, an amount of water greater than one mole is added. The charge is then heated under reflux to convert the excess anhydride to the corresponding acid. A small quantity of benzene is added since the dibasic acids of the anhydrides used have only slight solubility in benzene. The precipitated excess dibasic acid is removed by pressure filtration.

After filtering out the precipitated excess acid, the benzene was removed by means of a thin film rotary evaporator. The benzene thus served a dual purpose: reduction of viscosity for filtering and removal of residual water by azeotropic action. Complete removal of benzene was determined by infrared analysis.

The ingredients used in preparation of a typical batch included 684 grams castor oil (20H equivalents), 300 grams succinic anhydride (3 moles), and 4 grams of benzyldimethylamine. After the initial heating period of 6 to 8 hours at 120–130° C., 75 grams of water was added. After conversion of the excess anhydride to acid and removal of most of the excess water, 100 grams of benzene was added. The precipitated excess dibasic acid was removed by pressure filtration, and the excess benzene removed by means of a thin film rotary evaporator at between 80° C. and 100° C. The COOH equivalent of the purified adduct (III) prepared from this mixture was 412, as calculated from the acid number.

The adduct prepared as described immediately hereinabove was slightly syrupy in texture. The curing agent or adduct was mixed in varying ratios with a liquid diepoxide resin of the bisphenol A-epichlorohydrin type having an epoxy equivalent of 180 to 195. The composition was then cured under a range of from sixteen hours to twenty-four hours at 150–300° F. For formulation purposes the epoxy equivalent of the resin was assumed to be 190. Sample castings approximately ½-inch thick were prepared with various ratios of epoxy equivalents (in the resin) to COOH equivalents (in the adduct), 1% benzyldimethylamine being used as an accelerator. The following table lists the measured Shore hardness and Bayshore resiliometer values obtained for the various castings.

| | Resin compositions | | | | | |
|---|---|---|---|---|---|---|
| Epoxy equiv./carboxyl equiv. | Wt. epoxy resin (epoxy equiv. 190), g. | Wt. adduct (acid number 136 mg. KOH/gram), g. | N,N dimethylbenzylamine, g. | Shore hardness A | Shore hardness D | Bayshore resiliometer values |
| 1/1 | 19.0 | 41.2 | 0.56 | 29 | ------ | 9.5 |
| 1/.9 | 19.0 | 37.1 | 0.54 | 30 | ------ | 9.5 |
| 1/.8 | 19.0 | 32.9 | 0.52 | 34 | ------ | 4 |
| 1/.7 | 19.0 | 27.8 | 0.47 | 34 | ------ | 3.5 |
| 1/.6 | 19.0 | 24.7 | 0.44 | 35 | ------ | 2.5 |
| 1/.5 | 19.0 | 20.6 | 0.40 | 35 | ------ | 2.5 |
| 1/.4 | 19.0 | 16.5 | 0.37 | 72 | 23 | 16.5 |
| 1/.3 | 19.0 | 12.4 | 0.33 | ------ | 50 | 43 |
| 1/.2 | 19.0 | 8.2 | 0.29 | ------ | 77 | 32 |

The liquid resin compositions given in the above table were mixed by hand stirring until a uniform mixture was obtained. They were then poured into small aluminum dishes approximately 2" diameter. The samples were cured over a range of 16–24 hours at a temperature range of 180° F. Ideal reaction conditions were 20 hours at 200° F. Samples were allowed to cool to ambient conditions and the hardness and resiliometer tests were performed. The Shore hardness measurements are well known to those skilled in the art. The Bayshore Resiliometer Tester on which the resilience measurements were taken is a procedure by which a small weight is dropped on the specimen and the height to which it rebounds is measured on a scale. The rebound height is expressed as a percentage of the height from which the weight is dropped.

It is apparent from the above table that compositions (V) having ratios of epoxy equivalent/COOH equivalent greater than 1/.4 resulted in exhibited Bayshore resiliometer values of between 2.5 and 4.0. As noted hereinabove, these values are considerably lower than the resiliency values obtained with various rubbers used in the prior art as energy absorbing materials.

The inventive low resilience epoxy resin compounds exhibit considerable solvent resistance, and low water absorption. The materials are particularly useful as potting or encapsulation compounds for electronic equipment, the compositions providing excellent vibration and shock absorption, thereby permitting the encapsulated electronic component to be operated in extreme environments of vibration or mechanical shock.

While the illustrative example described hereinabove utilized castor oil (I), succinic anhydride (II) and an epoxy resin having an epoxy equivalent of between 180 and 195, the invention clearly is not so limited. As noted earlier, compositions (I) having an OH group in other than the 12 position may be used. Similarly, other cyclic anhydrides of a dicarboxylic acid can be employed, and various kinds of epoxy resins having epoxy equivalents of between about 120 and 1000 are suitable for application in the invention.

In addition to the application as an energy absorbing encapsulation compound or as a shock absorber, the inventive low resilience composition may be used as a toy. Thus when molded in the shape of a sphere, the inventive composition provides a novelty ball which when dropped on the ground exhibits substantially no bounce. Such a sphere of the inventive composition also may find application as a practice golf ball.

Although the invention has been described and illustrated in detail, it is to be clearly understood that the same is by way of illustration and example only and is not to be taken by way of limitation, the spirit and scope of this invention being limited only by the terms of the appended claims.

What is claimed is:

1. A low resilience composition, to provide protective encapsulation for components, cured under heat, consisting of the reaction product of a bisphenol A-epichlorohydrin type epoxy having an epoxy equivalent of between 120–1000, and a curing agent consisting of the reaction product of glyceryl triricinoleate and a cyclic anhydride of dicarboxylic acid having the following chemical structure:

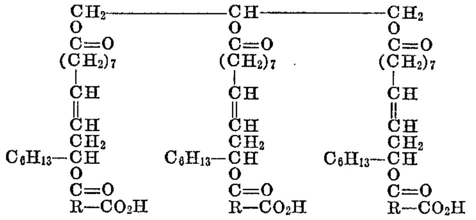

in the range of the ratio of epoxy equivalent to curing agent carboxyl equivalent between 2 and 1.25, and wherein said R is an alkylene, said composition providing an increase in energy-absorption characteristics when utilized for encapsulation of said components.

2. The composition recited in claim 1 wherein said composition was cured at a temperature range of from 180° F. to 250° F. within a period of from sixteen to twenty-four hours.

3. The composition recited in claim 1 wherein said composition was cured for approximately 20 hours at approximately 250° F.

References Cited

UNITED STATES PATENTS

| | | | |
|---|---|---|---|
| 3,527,720 | 9/1970 | Groff | 260—18 EP |
| 3,438,909 | 4/1969 | Kleeberg et al. | 260—18 EP |
| 2,999,824 | 9/1961 | Singleton et al. | 260—18 EP |

WILLIAM H. SHORT, Primary Examiner

T. E. PERTILLA, Assistant Examiner

U.S. Cl. X.R.

46—1 R; 117—161 ZB; 260—18 EP